United States Patent [19]
Taniguchi et al.

[11] Patent Number: 5,069,657
[45] Date of Patent: Dec. 3, 1991

[54] AUTOMATIC TRANSMISSION

[75] Inventors: Takao Taniguchi; Kazumasa Tsukamoto; Masahiro Hayabuchi; Koji Noda, all of Anjo, Japan

[73] Assignees: Aisin A W Kabushiki Kaisha, Anjo; Toyota Jidosha Kabushiki Kaisha, Toyota, both of Japan

[21] Appl. No.: 518,174

[22] Filed: May 3, 1990

[30] Foreign Application Priority Data

May 10, 1989 [JP] Japan .................. 1-115101

[51] Int. Cl.$^5$ .............................................. F16H 57/10
[52] U.S. Cl. ................................... 475/283; 192/87.11
[58] Field of Search ................ 475/116, 159, 291, 292, 475/330, 283, 285; 74/606 R, 467; 192/87.11, 87.14, 87.15

[56] References Cited

U.S. PATENT DOCUMENTS

| | | | |
|---|---|---|---|
| 3,564,938 | 4/1969 | Hause | 475/283 X |
| 3,757,607 | 9/1973 | Malloy | 475/283 |
| 3,857,303 | 12/1974 | Mouttet | 475/283 X |
| 4,233,861 | 11/1980 | Gaus et al. | 74/763 |
| 4,455,890 | 6/1984 | Kuramochi et al. | 475/285 X |
| 4,640,294 | 2/1987 | Ordo | 192/87.11 X |
| 4,660,439 | 4/1987 | Hiraiwa | 74/763 |
| 4,994,006 | 2/1991 | Kinoshita et al. | 192/87.15 X |
| 5,029,685 | 7/1991 | Takase et al. | 192/87.11 X |

FOREIGN PATENT DOCUMENTS 64-26053 4/1987 Japan .

Primary Examiner—Allan D. Herrmann
Assistant Examiner—Ryan W. Massey
Attorney, Agent, or Firm—Koda and Androlia

[57] ABSTRACT

An automatic transmission comprising a torque converter and a change speed transmission having a plurality of planetary gearsets and friction elements is provided with an input shaft supported by a transmission case. On the input shaft is mounted a small-diameter first drum. In the first drum are mounted a first clutch having a clutch piston, friction plates, separate plates and a clutch hub. On the input shaft is further mounted a large diameter second drum, in which are disposed a second clutch having a clutch piston, friction plates, separate plates and a clutch hub.

The friction plates and separate plates in the second drum are disposed radially outside on top of the friction plates and separate plates in the first drum.

6 Claims, 3 Drawing Sheets

AUTOMATIC TRANSMISSION

BACKGROUND OF THE INVENTION

1. Field of the Invention

The present invention relates to an automatic transmission for automobiles using a torque converter and planetary gear train.

The automatic transmission using the torque converter and a plurality of rows of planetary gearsets provides different gear ratios by selectively engaging the planetary gearsets by friction elements.

2. Description of the Prior Art

To achieve the formation of the gearshift positions to ensure smooth gearshift in an automatic transmission with multi-step gearshift positions, it is desired to use many friction elements. Of the friction elements, a clutch in particular is generally of such a construction that a clutch hub, friction plates, separate plates and a hydraulic piston as a servo device are housed within a rotatable drum. The provision of a number of clutches, therefore, requires space wide enough in the axial and diametral directions for the arrangement of the clutches. And besides, there will arise such a problem that it is difficult to provide a sufficient space for mounting a supporting device for supporting the rotating clutch drum.

SUMMARY OF THE INVENTION

The present invention has for its object to provide an automatic transmission having a clutch device which comprises a couple of clutches arranged in a radial direction for the purpose of decreasing the axial length of the transmission while maintaining a torque capacity of each clutch, and is capable of accurately counting rotation speed of the input power member.

To accomplish the above-mentioned object, the automatic transmission of the present invention has a shaft supported on a transmission case; a first drum having an outer cylinder and an inner cylinder mounted on the shaft; a first clutch components having a clutch piston, friction plates, separate plate and a clutch hub provided in the first drum; a second drum having an outer cylinder and an inner cylinder mounted on said input shaft; a second clutch components having a clutch piston, friction plates, separate plates and a clutch hub provided in the second drum; the outer cylinder of the second drum being disposed radially outside on top of the outer cylinder of the first drum, and the friction plates and the separates plates of the second clutch components provided in the second drum being disposed radially outside on top of the friction plates and the separate plate of the first clutch components provided in the first drum.

DETAILED DESCRIPTION OF THE REFERRED EMBODIMENTS

Exemplary embodiments of an automatic transmission according to the present invention will hereinafter be described with reference to the accompanying drawings.

Figure 1:
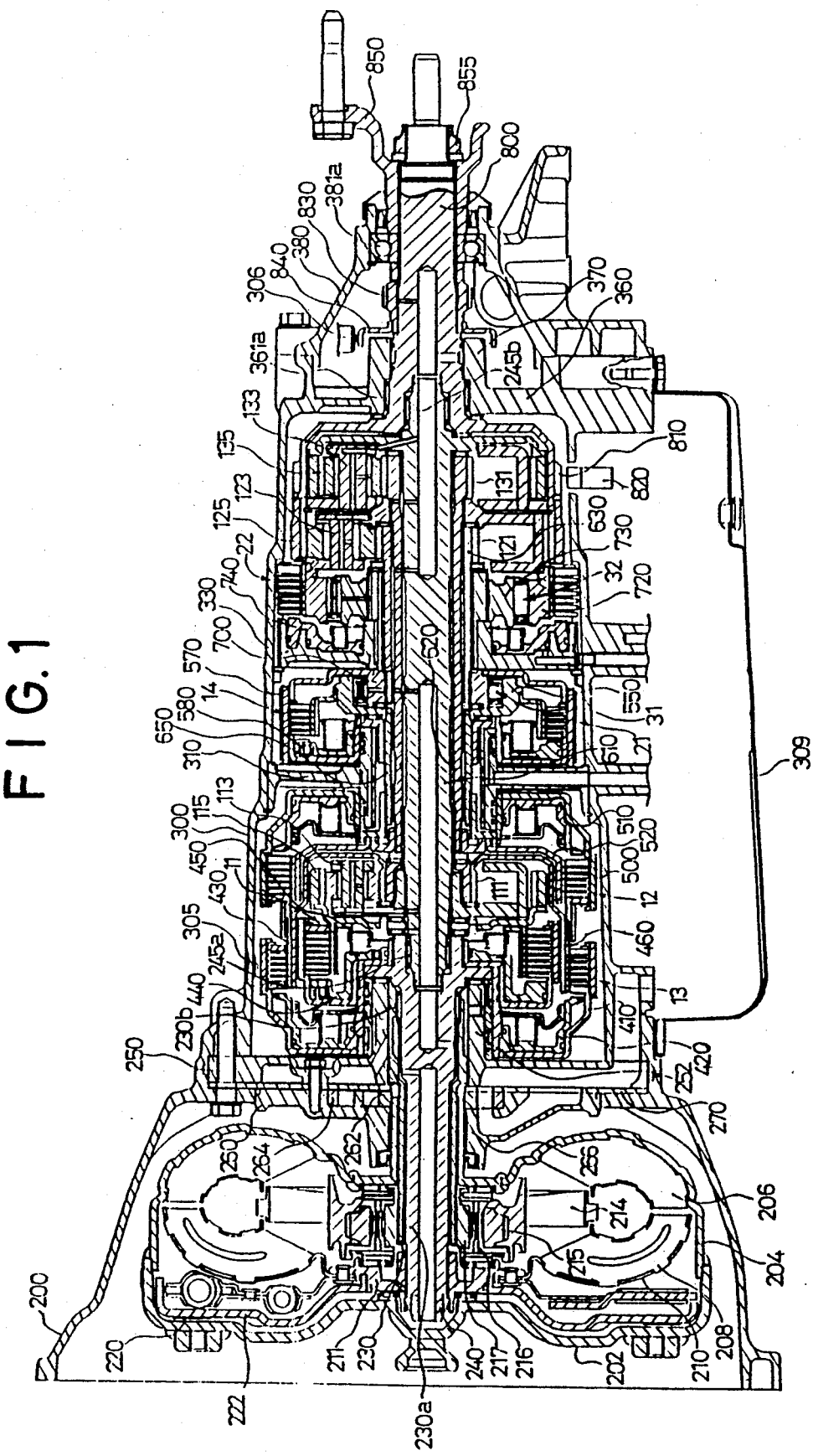
FIG. 1 is a general sectional view of an automatic transmission according to the present invention.
Figure 2:
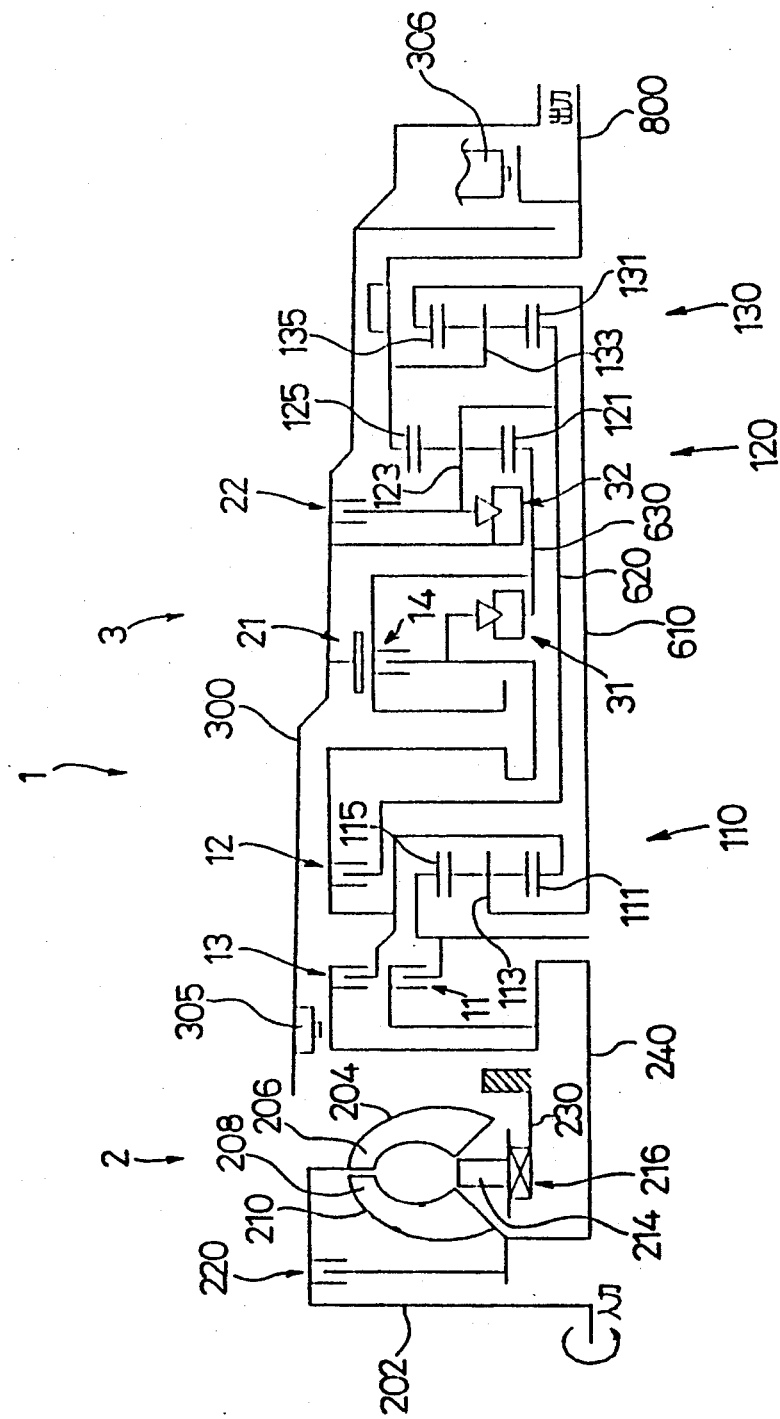
FIG. 2 is a schematic diagram of a gear train of the automatic transmission according to the present invention.

FIG. 1 is a general sectional view of the automatic transmission according to the present invention; and FIG. 2 is a schematic diagram of a gear train. First, the automatic transmission will be described by referring to FIG. 2.

An automatic transmission 1 has a torque converter 2 and a change-speed transmission 3 with planetary gearsets. As the torque converter 2, a suitable means such as a hydraulic coupling, an electromagnetic clutch, a multiple-disc clutch, and a centrifugal clutch can be selected beside a hydraulic torque converter shown in the present embodiment.

The torque converter 2 has a rear cover 204 connected to the rear end of a front cover 202 which is driven to rotate by an engine, and a pump impeller 206 formed on the inner wall surface of the rear cover 204. A turbine runner 208 disposed oppositely to the pump impeller 206 is held by a turbine shell 210. The turbine shell 210 is coupled to an input shaft 240 which serves as an output member of the torque converter 2 and also as an input member of the change speed transmission 3 by its inner peripheral portion. Between the pump impeller 206 and the turbine runner 208 is disposed a stator 214, the inner peripheral portion of which is coupled with the outer race of a one-way clutch 216. The inner race of the one-way clutch 216 is fixedly mounted on the outer peripheral portion of a supporting cylinder 230 which is a stationary member. Between the front cover 202 and the turbine shell 210 is disposed a lockup clutch 220 directly coupling the front cover 202 with the turbine shell 210.

The change speed transmission 3 has a case, in which a planetary gear train and friction elements are contained. The planetary gear train comprises three rows of simple planetary gearsets 110, 120 and 130.

A pinion carrier 113 of a first simple planetary gearset 110 is connected to a ring gear 135 of a third simple planetary gearset 130, and a pinion carrier 133 of the third simple planetary gearset 130 is connected to a ring gear 125 of a second simple planetary gearset 120 and also to an output shaft 800. A sun gear 131 of the third simple planetary gearset 130 is connected to a pinion carrier 123 of the second simple planetary gearset 120 and also to a sun gear 121 of the second simple planetary gearset 120 through the friction elements.

The friction elements include four clutches, two brakes and two one-way clutches. The relation of connection with friction elements and each element of the planetary gear train is as described below.

The input shaft 240 of the change speed transmission 3 is connected to the drum of a first clutch 11 and to the drum of a third clutch 13. The first clutch 11 hub is connected to a ring gear 115 of a first simple planetary gearset 110, and the third clutch 13 hub is connected to a sun gear 111 of the first simple planetary gearset 110. The third clutch 13 hub is connected to the drum of a second clutch 12 and further to the hub of a fourth clutch 14 and the outer race of a first one-way clutch 31.

The hub of the second clutch 12 is connected to a sun gear 131 of the third simple planetary gearset 130 through a second intermediate shaft 620, and also to the pinion carrier 123 of the second simple planetary gearset 120. This pinion carrier 123 is further connected to the outer race of the second one-way clutch 32 which serves also as the hub of a second brake 22. The inner race of the second one-way clutch 32 is attached to a case 300 which is a stationary member.

The drum of the fourth clutch 14 serves as the drum of a first brade 21, and also is connected to the sun gear 121 of the second simple planetary gearset 120 through the inner race of the first one-way clutch and a third intermediate shaft 630.

The pinion carrier 113 of the first simple planetary gearset 110 is connected to the ring gear 135 of the third simple planetary gearset 130 through a first intermediate shaft 610, and the pinion carrier 133 is connected to the second simple planetary gearset 120.

On the outer side of the third clutch 13 which is directly coupled to the input shaft 240, a first rotation sensor 305 is mounted to obtain an information on the rotation of the input shaft 240. On the outer side of the output shaft 800 also is mounted on a second rotation sensor 306 to obtain an information on the rotation of the output shaft 800.

FIG. 1 is a sectional view showing the concrete construction of the automatic transmission having the schematic diagram explained with reference to FIG. 2.

The torque converter 2 used in the automatic transmission 1 is a hydraulic torque transmitting device, which is housed inside of a housing 200 opening on the engine side (hereinafter referred to as the "front side"). As the rear of the front cover 202 driven by the power from the engine is integrally mounted the rear cover 204. On the inner peripheral wall surface of the rear cover 204 is formed the pump impeller 206. The turbine runner 208 disposed facing with the pump impeller 206 is supported by the turbine shell 210. The turbine shell 210 is connected to the input shaft 240, which serves as the output member of the torque converter 2 and an input member of the change-speed transmission 3, through a connecting member 211 at the inner peripheral portion thereof. Between the pump impeller 206 and the turbine runner 208 is disposed the stator 214. The inner peripheral part of this stator 214 is connected to an outer race 215 of a one-way clutch 216, and an inner race 217 of the one-way clutch 216 is attached to the front end outer peripheral part of the supporting cylinder 230. Between the front cover 202 and the turbine shell 210 is disposed the lockup clutch 220 having a lockup piston 222.

To the rear part of the housing 200 is connected the cylindrical case 300 containing the component elements of the change speed transmission 3. To the joint sections of the housing 200 and the transmission case 300, an oil pump housing 260 is attached through an oil pump cover 250 and a partition plate 270. In the oil pump housing 260 is housed an internal gear pump constituted of an external gear 262 and an internal gear 264. The inner peripheral part of the external gear 262 is connected to a shaft 266 formed integral with the rear cover 204. The central part of the oil pump cover 250 forms a cylindrical supporting section 252 protruding out rearwardly, and in the inner peripheral portion of this supporting section 252 is press-fitted the rear outer peripheral section of the supporting cylinder 230.

The supporting cylinder 230 is used to support the input shaft 240 through bearings 230a and 230b at two points of the inner peripheral section thereof. On the rear portion of the input shaft 240 is formed a flange section expanding in a radial direction. On the outer peripheral section is mounted a drum 410 which contains the third clutch 13. In this drum 410 a piston 420 operating the third clutch 13 is arranged. On the outer peripheral portion at the rear end of the input shaft 240 is mounted a drum 430 which contains the first clutch 11. In the drum 430 is disposed a piston 440 which operates the first clutch 11. A hub 450 of the first clutch 11 is connected integrally with the ring gear 115 of the first simple planetary gearset. A hub 460 of the third clutch 13 is integrally connected at the inner peripheral section with the sun gear 111 of the first simple planetary gearset. The pinion carrier 113 of the first simple planetary gearset is connected with the first intermediate shaft 610. The hub 460 of the third clutch 13 is connected at the outer peripheral section with the drum 500 containing the second clutch 12. In this drum 500 is disposed a piston 510 which operates the second clutch 12.

A hub 520 of the second clutch 12 is connected at the inner peripheral section with the second intermediate shaft 620, which is concentrically supported on the outer peripheral section of the first intermediate shaft 610. The drum 500 of the second clutch 12 is integrally connected through its inner cylinder section with a sleeve 650 concentrically supported on the outer peripheral section of the second intermediate shaft 620.

In the transmission case 300, a first central supporting member 310 and a second central supporting member 330 are attached. The inner peripheral part of the first central supporting member 310 has a cylindrical form longitudinally projecting. A servo oil pressure is supplied into a related drum through this cylindrical part.

The rear end portion of the sleeve 650 is connected to the outer race 550 of the first one-way clutch 31. The outer race 550 is integrally connected to the hub of the fourth clutch 14. The outer peripheral surface of a drum 570 in which the fourth clutch 14 is installed serves as the drum of the first brake 21. In the drum 570 is arranged a piston 580 which operates the fourth clutch 14.

An inner race 700 of the first one-way clutch 31 is in connection with the third intermediate shaft 630 supported on the outer peripheral portion of the second intermediate shaft 620, and the sun gear 121 of the second simple planetary gearset is formed at the rear end section of the third intermediate shaft 630.

The pinion carrier 123 of the second simple planetary gearset is in mesh with splines on the second intermediate shaft 620. At the rear end of this second intermediate shaft 620 is formed the sun gear 131 of the third simple planetary gearset.

The pinion carrier 123 of the second simple planetary gearset is connected to an outer race 720 of a second one-way clutch 32, the outer race 720 serving also as the hub of the second brake 22. The inner race 730 of the second one-way clutch 32 is fixedly attached to the second central supporting member 330. In the rear wall surface of the second central supporting member 330 is disposed a piston 740 which operates the second brake 22.

The rear end of the first intermediate shaft 610 is supported by the output shaft 800 through a bearing. Immediately before the bearing, the first intermediate shaft 610 is expanded in a form of flange, on the outer peripheral part of which is formed the ring gear 135 of the third simple planetary gearset. The pinion carrier 133 of the third simple planetary gearset is connected to the ring gear 125 of the second simple planetary gearset and also to the output shaft 800.

At the inner peripheral section of the rear wall 360 of the transmission case 300, a cylindrical support section 370 is formed to support the front portion of the output shaft 800 through a bearing 361a. At the rear end of the case 300 is concentrically fixed a rear case 380 through an engaging section, and the rear portion of the output shaft 800 is supported by the rear case 380 through a bearing 381a. Accordingly the output shaft 800 is firmly supported on the bearings 361a and 381a at two points, and the first intermediate shaft 610 is firmly supported at the front and rear ends by the input shaft 240 and the output shaft 800 through bearing 245a and 245b.

On the front drum-like outer peripheral portion of the output shaft 800 is formed a parking gear 810, constituting, together with a pawl 820 oppositely arranged, a parking brake. On the output shaft 800 are mounted a speedometer drive gear 830 and a flange 840 having a slit around, through which an information on the rotation of the output shaft 800 is obtained by the rotation sensor 306. On the rear On the front drum-like outer peripheral portion of the output shaft 800 is formed a parking gear 810, constituting, together with a pawl 820 oppositely arranged, a parking brake. On the output shaft 800 are mounted a speedometer drive gear 830 and a flange 840 having a slit around, through which an information on the rotation of the output shaft 800 is obtained by the rotation sensor 306. On the rear end portion of the output shaft is securely mounted a connecting member 850 by a nut 855.

At the bottom of the transmission case 300 is mounted a hydraulic control device which is not illustrated, which is covered with a cover 309 serving also as an oil pan.

The automatic transmission of the present invention. As described above, comprises four clutches, two brakes, and two one-way clutches, as friction elements, to achieve five forward speeds and one reverse speed. Table 1 shows the operating condition of each friction element at each gearshift position.

TABLE 1

|  | Clutch | | | | Brake | | One-way clutch | |
| --- | --- | --- | --- | --- | --- | --- | --- | --- |
|  | 11 | 12 | 13 | 14 | 21 | 22 | 31 | 32 |
| 1st | O |  |  | (O) |  | (O) | O | O |
| 2nd | O | O |  |  |  | (O) |  | O |
| 3rd | O |  | O |  |  | (O) |  | O |
| 4th | O |  | O | O |  |  | O |  |
| 4Ath |  | O | O |  |  |  | O |  |
| 5th |  | O | O |  | O |  |  |  |
| Reverse |  |  | O | O |  | O |  |  |

In the above table, the mark "O" indicates the engagement of the friction element. The mark (O) indicates engagement during engine brake application. The 4A speed has the same gear ratio as the 4th speed, and appears immediately before a shift to the 5th is made.

Figure 3:
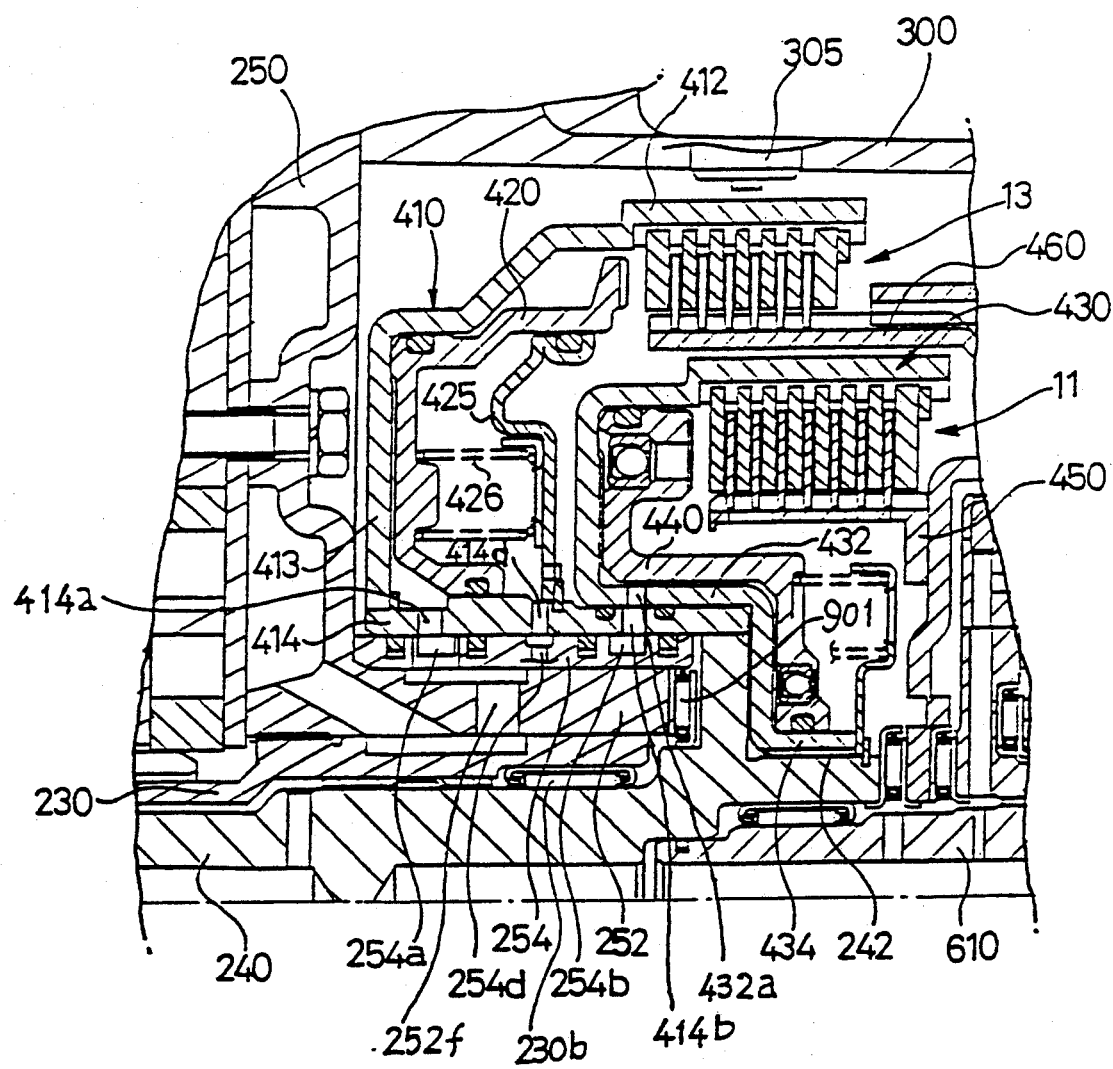
FIG. 3 is a sectional view showing a part of the automatic transmission.

The present invention relates particularly to a clutch device of an automatic transmission having the aforementioned constitution, which will be described in detail with reference to FIG. 3.

The oil pump cover 250 fixedly attached at the front part of the automatic transmission case 300 projects backwardly at the central part, being formed into the cylindrical supporting section 252. In the inner periphery of the supporting section 252 the supporting cylinder 230 is pressed and fixed, and the input shaft 240 is firmly supported on a bearing 230b in the inner periphery of the supporting cylinder 230. The input shaft 240 expands in a flange form in the vicinity of the rear end thereof, and on its outer periphery is fixedly mounted a cylinder member 414 by such a means as welding. Between the flange form of the input shaft 240 and the cylindrical supporting section 252 is mounted a thrust bearing 901.

The whole body of the cylinder member 414 forms the inner cylinder of a large-diameter drum indicated by numeral 410, being produced for example by cutting a cylindrical material and welding a drum member having an outer cylinder 412 and a wall surface 413 to the outer periphery of its front end. The drum member having the outer cylinder 412 and the wall surface 413 is manufactured by pressing.

The input shaft 240 is provided with splines 242 on the outer periphery of its rear end, on which the small-diameter portion 434 of the inner cylinder of a small-diameter drum indicated by numeral 430 is mounted. The inner cylinder of this drum 430 is formed into a stepped cylinder with the large-diameter portion 432 being disposed on the outer periphery of the cylinder member 414.

The sleeve 254 disposed on the inner peripheral side of the cylinder member 414 is pressed onto, and fixed on, the outer periphery of the supporting section 252. Oil passages 254a and 254b formed in the sleeve 254 are used to supply a servo oil pressure into two drums 410 and 430 through oil passages 414a and 414b formed in the cylinder member 414, and to supply a dynamic pressure generating oil to a centrifugal oil pressure canceling device through an oil passage 254d and an oil passage 414d.

The oil passage 254a of the sleeve 254 communicates with an oil passage 252f provided in the supporting section 252 on the inner peripheral side, and communicates with the servo oil pressure supplying device through an oil passage provided in the oil pump cover 250. Similarly the oil passage 252b, as shown in FIG. 1, communicates with the servo oil pressure supplying device through another oil passage (not illustrated in FIG. 3) provided in the supporting section 252, thereby supplying the servo oil pressure into the drum 430 through the oil passage 432a provided in the inner cylinder 432 of the drum 430.

In the large-diameter drum 410 is inserted a clutch piston 420 to form a servo chamber, and the third clutch 13 components are disposed. A centrifugal oil pressure canceling device 425 is provided facing with the clutch piston 420, an oil chamber being formed between the clutch piston 420 and the centrifugal oil pressure canceling device 425. This device serves to offset a residual pressure of the servo oil pressure in the servo chamber, which is caused by the centrifugal oil pressure when the servo oil pressure is removed from the oil passage 254a while the drum 410 is rotating. There is introduced for example a lubricating oil into the oil chamber formed between the clutch piston 420 and the canceling device 425 through the oil passage 254d, generating a dynamic pressure balancing with the residual pressure. Therefore, the clutch piston 420 is moved back properly to the original position by a return spring 426 without being affected by the centrifugal oil pressure. A check ball may be used in place on this device to the clutch piston 420.

In the small-diameter drum 430 arranged inside of the large-diameter drum 410 are disposed the first clutch 11 components having a clutch piston 440 which presses friction plates and separate plates of the first clutch 11 components. The clutch piston 440 has a large-diameter annular section and a small-diameter annular section as sectional forms; the two annular sections are connected by a cylindrical part, forming a stepped construction. The inner peripheral end thereof slides relative to a small-diameter inner cylinder 434 of the drum 430. Adopting this piston configuration can provide a pressure receiving surface area necessary for receiving the servo oil pressure.

On the outer periphery of the large-diameter drum 410, there is provided a mark not illustrated, a stepped section of the splines, or a hole formed in the drum, by which the speed of rotation of the drum 420 is detected by means of the rotation sensor 305 provided inside of the case 300. The drum 410, being connected to the input shaft 240, can obtain an input rotation information required for control gearshift operation.

As previously explained by referring to FIGS. 1 and 2, the hub 450 of the first clutch 11 components is connected to the ring gear 115 of the first simple planetary gearset and the hub 460 of the third clutch 13 to the sun gear 11 of the first simple planetary gearset, and also connected to the outer race 550 of the first one-way clutch 31 which serves also as a hub of the fourth clutch 14, through the drum 500 of the second clutch 12.

Next, as shown in Table 1, the first clutch 11 is used to make shifts ranging from forward 1st gear to 4th gear, to transmit the input power to each of these gears. Since a great torque is transmitted particularly in the forward low-speed position, the first clutch 11 requires a torque capacity and a thermal capacity. To obtain a great torque capacity, it is advantageous to increase the clutch diameter. However, the first clutch 11 is released at the 5th speed, or overdrive, the clutch hub 450 racing at a high speed in relation to the drum 430. To minimize the effect of this racing, it is advantageous to decrease the clutch diameter. Also, the piston 440 which operates the clutch 11 removes the servo oil pressure when upshifting from the 4th to the 5th speed at which the drum 430 turns at a high speed. Therefore, to eliminate the effect of the centrifugal oil pressure, it is desirable to use a small-diameter clutch.

According to the present invention, with the aforementioned elements taken into consideration, the first clutch 11 adopted is a small-diameter clutch with an increased number of friction plates and separate plates to provide the torque capacity and thermal capacity. Further, the inner peripheral section of the clutch piston 440 which operates the clutch was made as small as practicable, thereby maintaining a pressure receiving surface area and eliminating the effect of the centrifugal oil pressure.

In the meantime, the third clutch 13 is engaged when an upshift from the 2nd to the 3rd gear is made, maintaining the engaged state up to the 5th speed. For the reverse, this clutch 13 is engaged to transmit the input power. Therefore, this clutch requires the torque capacity and the thermal capacity, but the effect of the centrifugal oil pressure can be reduced.

In the present invention, the first clutch 11 and the third clutch 13 are arranged in a radial direction, positively utilizing their characteristics, thus enabling the reduction of the axial size thereof. The small-diameter drum 430 containing the first clutch 11 and the large-diameter clutch 410 containing third clutch 13 are fixedly attached to the input shaft and the input shaft is firmly supported by the supporting cylinder 230 formed integral with the oil pump cover 250; therefore, the two drums 410 and 430 are supported with greater rigidity. In addition, oil passages for supplying oil pressure to the two drums 410 and 430 are also formed through the sleeve 254 made integral with the oil pump cover 250, thereby improving the durability of the seal member.

In the present invention, as described above, the input shaft of the transmission is firmly supported by a member formed integral with the transmission case and two large and small clutch drums are fixedly mounted radially on the end portion of the input shaft, thereby enabling the reduction of the axial size of the transmission. The clutch components in the two clutch drums are assembled in a radial direction in a most reasonable manner because proper clutch function and torque capacity have been positively selected to ensure smooth operation despite of a difference in the diameters of the two clutches.

Since bearings supporting the two clutch drums are also used to support the input shaft, the number of the bearings can be decreased.

Into the two drums a servo oil pressure is supplied directly from a stationary member, and therefore the clutches can respond well to the oil pressure and the seal members have better durability. Further, information as to the input rotation necessary for control can be accurately detected by the rotation sensor disposed outside of the large-diameter drum.

What is claimed is:

1. An automatic transmission having a change-speed transmission including a plurality of planetary gearsets and friction elements comprising:

a casing having a cylindrical supporting member provided integrally therewith and extended therefrom coaxially with a driving shaft, a first drum having an outer cylinder, an inner cylinder and an annular wall portion connecting said outer and inner cylinders; said inner cylinder being formed in a form of a stepped cylinder having a larger-diameter cylinder connected to said annular portion, a smaller-diameter cylinder and an annular wall portion connecting said larger-diameter cylinder and smaller diameter cylinder; and said smaller-diameter cylinder being connected to said driving shaft, a second drum having an outer cylinder disposed coaxially with and radially outwardly from said outer cylinder of said first drum, an inner cylinder disposed coaxially with and radially inwardly from said smaller-diameter cylinder of said first drum and an annular wall portion connecting said outer and inner cylinders;

said larger-diameter cylinder of said first drum being mounted on outer peripheral surface of said inner cylinder of said second drum; and said inner cylinder being rotatably mounted on an outer cylindrical periphery of said cylindrical supporting member and connected to said driving shaft at one end thereof, a first clutch component for connecting and disconnecting a member of a planetary gearset of said change-speed transmission to and from said driving shaft through said first drum including a first clutch piston disposed between said outer cylinder and inner cylinder of said first drum and friction plates disposed inside of said outer cylinder of said first drum, a second clutch component for connecting and disconnecting a member of a planetary gearset of said change-speed transmission to and from said driving shaft through said second drum including a second clutch piston disposed between said outer cylinder and inner cylinder of said second drum and friction plates disposed inside of said outer cylinder of said second drum, and oil passages being formed in said cylindrical supporting member; one of said oil passages being communicated with a pressure chamber formed between said first clutch piston and said annular wall portion connected to said outer cylinder and said inner cylinder of said first drum through passages formed in said inner cylinder of said second drum and said larger-diameter cylinder of said first drum, respectively; and one of said oil passages being communicated with a pressure chamber formed between said second clutch piston and said annular wall portion of said second drum through a passage formed in said inner cylinder of said second drum.

2. An automatic transmission as claimed in claim 1, wherein said smaller-diameter cylinder of said first drum is connected to said driving shaft by splines.

3. An automatic transmission as claimed in claim 1, wherein said inner cylinder of said second drum is fixed to a flange portion formed on the outer periphery of said driving shaft.

4. An automatic transmission as claimed in claim 1, wherein a sleeve is fixed on the outer periphery of said cylindrical supporting member for supporting said inner cylinder of said second drum rotatably and said oil passages are formed in said sleeve for communication between said oil passages in said cylindrical supporting member and passages formed in said inner cylinder of said second drum, respectively.

5. An automatic transmission as claimed in claim 1, wherein a ring gear of a planetary gearset is connected to said driving shaft through said first clutch component when forward gear trains having lower speed gear ratios are established and a sun gear of said planetary gearset is connected to said driving shaft through said second clutch component when forward gear trains having higher speed gear ratios and reverse gear train are established.

6. An automatic transmission as claimed in any one of claims 1–5, further comprising: a rotation sensor mounted on said casing for sensing rotational speed of said second drum.

* * * * *